United States Patent
Sun et al.

(10) Patent No.: US 12,232,159 B2
(45) Date of Patent: Feb. 18, 2025

(54) ENHANCED MONITORING AND INCIDENT DETECTION IN A NETWORK

(71) Applicant: Telefonaktiebolaget LM Ericsson (publ), Stockholm (SE)

(72) Inventors: Bin Sun, Luleå (SE); Yifei Jin, Solna (SE); Athanasios Karapantelakis, Solna (SE); Daniel Lindström, Luleå (SE); Lackis Eleftheriadis, Valbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 234 days.

(21) Appl. No.: 17/760,533

(22) PCT Filed: Sep. 16, 2019

(86) PCT No.: PCT/EP2019/074696
§ 371 (c)(1),
(2) Date: Mar. 15, 2022

(87) PCT Pub. No.: WO2021/052558
PCT Pub. Date: Mar. 25, 2021

(65) Prior Publication Data
US 2022/0361188 A1    Nov. 10, 2022

(51) Int. Cl.
*H04W 72/542* (2023.01)
*H04B 17/318* (2015.01)
*H04W 64/00* (2009.01)

(52) U.S. Cl.
CPC ........ *H04W 72/542* (2023.01); *H04B 17/318* (2015.01); *H04W 64/006* (2013.01)

(58) Field of Classification Search
CPC ... H04W 72/542; H04W 64/006; H04W 4/02; H04W 36/06; H04W 4/90; H04W 24/00;
(Continued)

(56) References Cited

U.S. PATENT DOCUMENTS 9,369,936 B2    6/2016    Chin et al.
2011/0111736 A1*  5/2011   Dalton ............... A61B 5/14542
                                                  600/595
(Continued)

FOREIGN PATENT DOCUMENTS

WO    WO 2016/181332 A1    11/2016
WO    WO-2016198123 A1 *  12/2016  ........... H04B 7/0408
WO    WO 2018/068811 A1    4/2018

OTHER PUBLICATIONS

International Search Report and Written Opinion of the International Searching Authority, PCT/EP2019/074696, mailed Sep. 25, 2020, 21 pages.
(Continued)

*Primary Examiner* — Huy C Ho
(74) *Attorney, Agent, or Firm* — Sage Patent Group

(57) ABSTRACT

A wireless device, network node and network management node are disclosed. The wireless device, network node and management node may cooperate to facilitate monitoring of the wireless device and detection of an incident involving a user of the wireless device. The wireless device is operable to connect to a network and comprises processing circuitry configured to cause the wireless device to enter an enhanced monitoring mode, receive, from a network node, configuration information specifying a measuring configuration for measuring signal strength, and measure signal strength in accordance with the received configuration information.

27 Claims, 17 Drawing Sheets

(58) Field of Classification Search
CPC ............... H04B 17/318; H04B 7/0695; G08B 21/0492; G08B 21/0247; G08B 21/0283; G08B 21/0423; G08B 21/043; G08B 25/001; G08B 25/016; G08B 29/186
USPC ...................................... 455/452.1
See application file for complete search history.

(56) References Cited

U.S. PATENT DOCUMENTS

| | | |
|---|---|---|
| 2017/0270462 A1 | 9/2017 | Morgenthau et al. |
| 2019/0051144 A1 | 2/2019 | David et al. |
| 2019/0228628 A1* | 7/2019 | Dröscher ............... G10L 15/26 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 14) 3GPP TS 23.401 V14.3.0 (Mar. 2017) 92 pages.

3rd Generation Partnership Project; Technical Specification Group Services and System Aspects; Functional architecture and information flows to support Mission Critical Data (MCData); Stage 2 (Release 16) 3GPP TS 23.282 V16.0.0 (Sep. 2018) 107 pages.

* cited by examiner

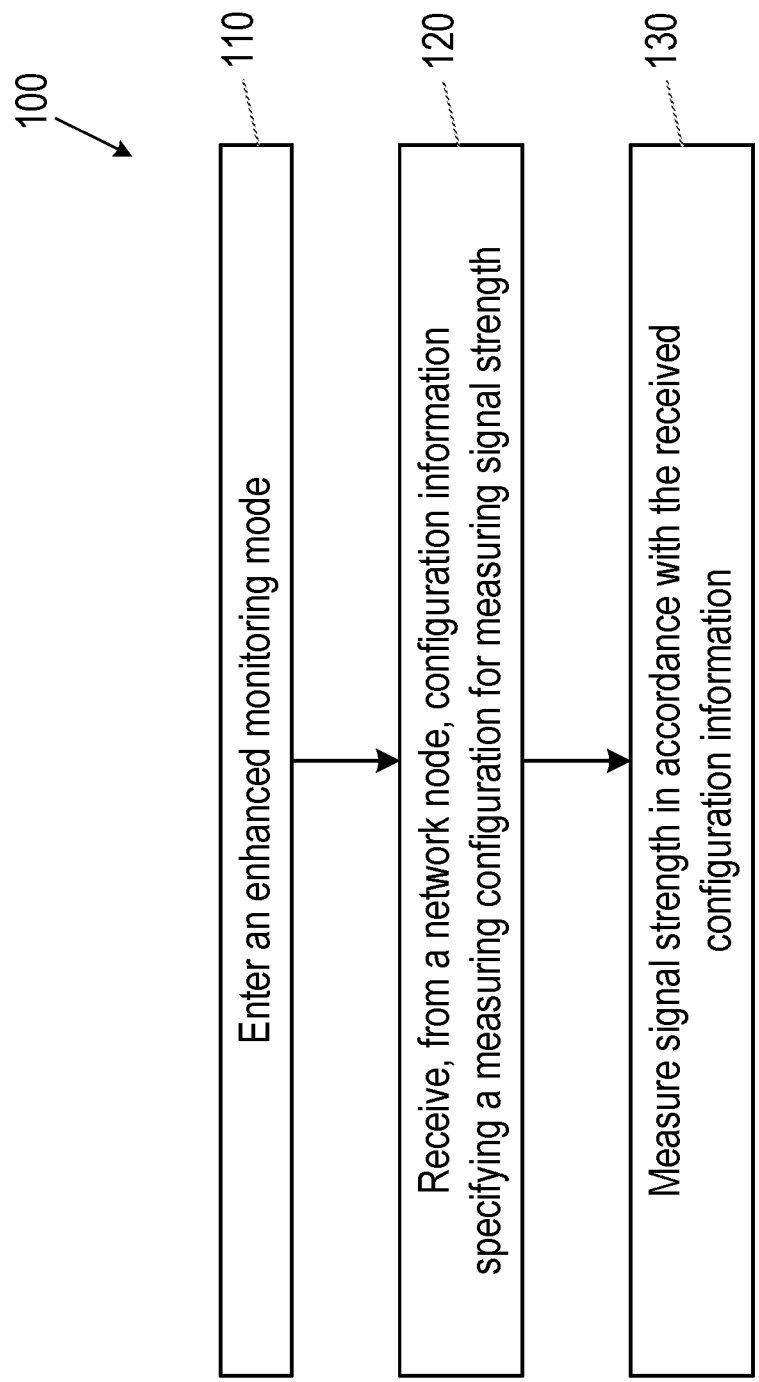

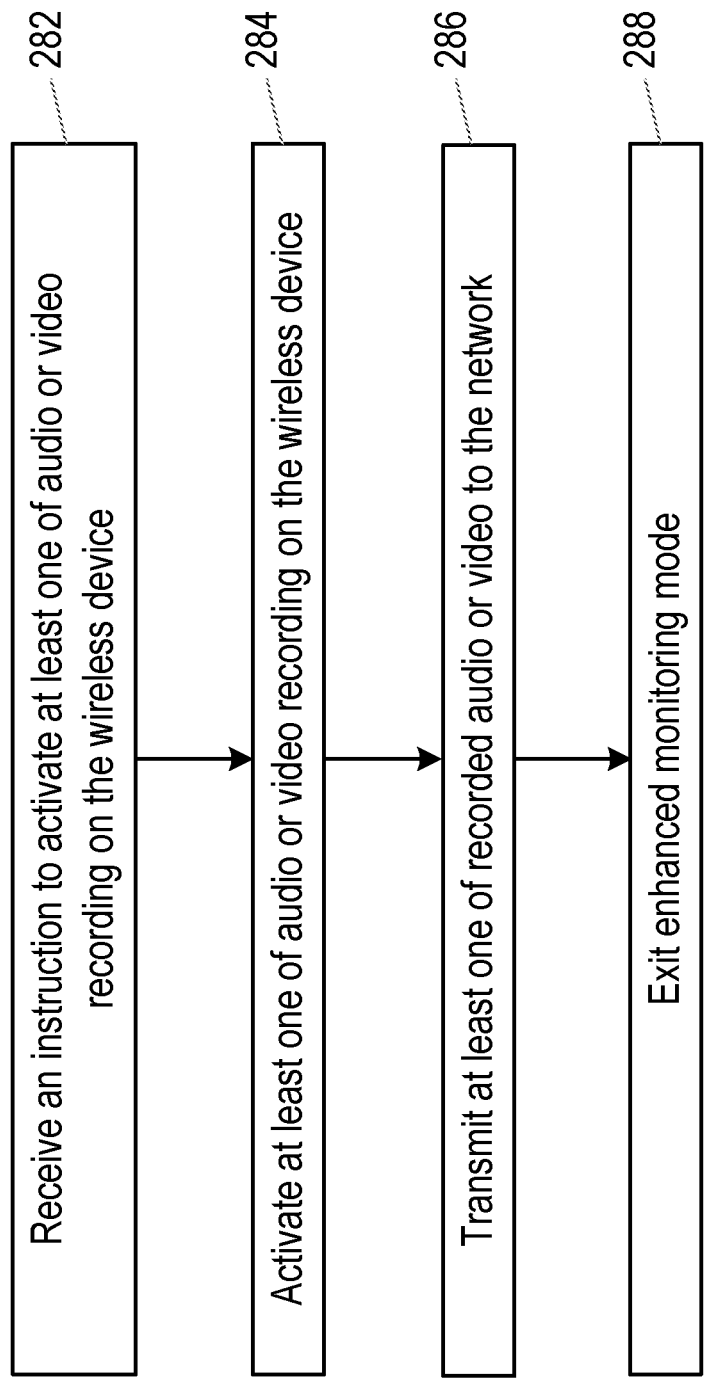

ENHANCED MONITORING AND INCIDENT DETECTION IN A NETWORK

CROSS REFERENCE TO RELATED APPLICATIONS

This application is a 35 U.S.C. § 371 national stage application of PCT International Application No. PCT/EP2019/074696 filed on Sep. 16, 2019, the disclosure and content of which is incorporated by reference herein in its entirety.

TECHNICAL FIELD

The present disclosure relates to a wireless device that is operable to connect to a network and to a network node and a management node within a network. The present disclosure also relates to methods of operating a wireless device, a network node and a management node, which methods may facilitate the detection of incidents involving a user of the wireless device.

BACKGROUND

In many indoor and outdoor working environments, technicians, engineers and other operators may experience safety risks owing to a range of possible hazards. Indoor risks include slips, trips, falls owing to unstable, wet or undulate surfaces, ground cords, exposed high-voltage, fire, toxic air and smoke. Outdoor environments present similar risks to those previously outlined, and also present risks including falling when working at height, injury from falling objects, heavy equipment, vehicle movements etc. Incidents during transport to a working environment, particularly a remote environment, as well as ergonomic injuries are also possible, regardless of the nature of the working environment.

In an effort to mitigate the above discussed risks, operators are often required to work in teams of at least two people, ensuring that someone will be available to call appropriate emergency services or operational center in the event of an incident. For situations in which an operator is required to work alone, the operator may be issued with a panic alarm equipped with location information (such as GPS). In the event of an incident, the operator triggers the panic alarm and the location information enables appropriate assistance to navigate to the site.

A panic alarm may be implemented using a mobile phone, via an emergency button, or may be a dedicated device, such as an international emergency beacon. However they generally rely upon the person affected by an incident to trigger the alarm. This may be impossible if the affected person is unconscious or incapacitated. In addition, the manner in which an alarm is triggered may vary between devices, particularly in the case of an alarm implemented on a mobile phone. Differences between devices or brands imposes learning costs and a risk that the alarm will not be correctly used when needed owing to stress or other factors. It has also been established that during incident reporting, actions that rely on human input tend to introduce mistakes and delays. It would therefore be desirable to provide an automated system for incident detection and management.

SUMMARY

It is an aim of the present disclosure to provide a wireless device, a network node and a network management node, methods and computer readable medium which at least partially address one or more of the challenges discussed above.

According to a first aspect of the present disclosure, there is provided a wireless device that is operable to connect to a network. The wireless device comprises processing circuitry configured to cause the wireless device to enter an enhanced monitoring mode, receive, from a network node, configuration information specifying a measuring configuration for measuring signal strength, and measure signal strength in accordance with the received configuration information.

According to another aspect of the present disclosure, there is provided a network node. The network node comprises processing circuitry configured to cause the network node to cooperate with a wireless device to enable the wireless device to enter an enhanced monitoring mode, allocate at least one beam of a radio network node in the network to the wireless device, transmit to the wireless device configuration information specifying a measuring configuration for measuring signal strength on the allocated beam, and monitor signal strength of the wireless device on the allocated beam.

According to another aspect of the present disclosure, there is provided a network management node. The network management node comprises processing circuitry configured to cause the network management node to detect the occurrence of an incident with respect to a wireless device that is in an enhanced monitoring mode, confirm the detected incident as true or false and, if the detected incident is true, notify an emergency service.

According to another aspect of the present disclosure, there is provided a method for operating a wireless device that is operable to connect to a network. The method, performed by the wireless device, comprises entering an enhanced monitoring mode, receiving, from a network node, configuration information specifying a measuring configuration for measuring signal strength, and measuring signal strength in accordance with the received configuration information.

According to another aspect of the present disclosure, there is provided a method for operating a network node. The method, performed by the network node, comprises cooperating with a wireless device to enable the wireless device to enter an enhanced monitoring mode, allocating at least one beam of a radio network node in the network to the wireless device, transmitting, to the wireless device, configuration information specifying a measuring configuration for measuring signal strength on the allocated beam, and monitoring signal strength of the wireless device on the allocated beam.

According to another aspect of the present disclosure, there is provided a method for operating a network management node. The method, performed by the network management node, comprises detecting the occurrence of an incident with respect to a wireless device that is in an enhanced monitoring mode, confirming the detected incident as true or false, and, if the detected incident is true, notifying an emergency service.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

Advantages of the methods, device, nodes and procedures disclosed herein include a fully automated procedure that shortens incident reporting time and can save more lives. In addition, the present disclosure may be implemented in accordance with existing or modified 3GPP standards and is applicable to any industry.

BRIEF DESCRIPTION OF THE DRAWINGS

For a better understanding of the present disclosure, and to show more clearly how it may be carried into effect, reference will now be made, by way of example, to the following drawings in which:

FIG. 1 is a flow chart illustrating a method performed by a wireless device that is operable to connect to a network;

FIGS. 2a to 2c show a flow chart illustrating another example of a method performed by a wireless device that is operable to connect to a network;

DETAILED DESCRIPTION

Figure 2A:
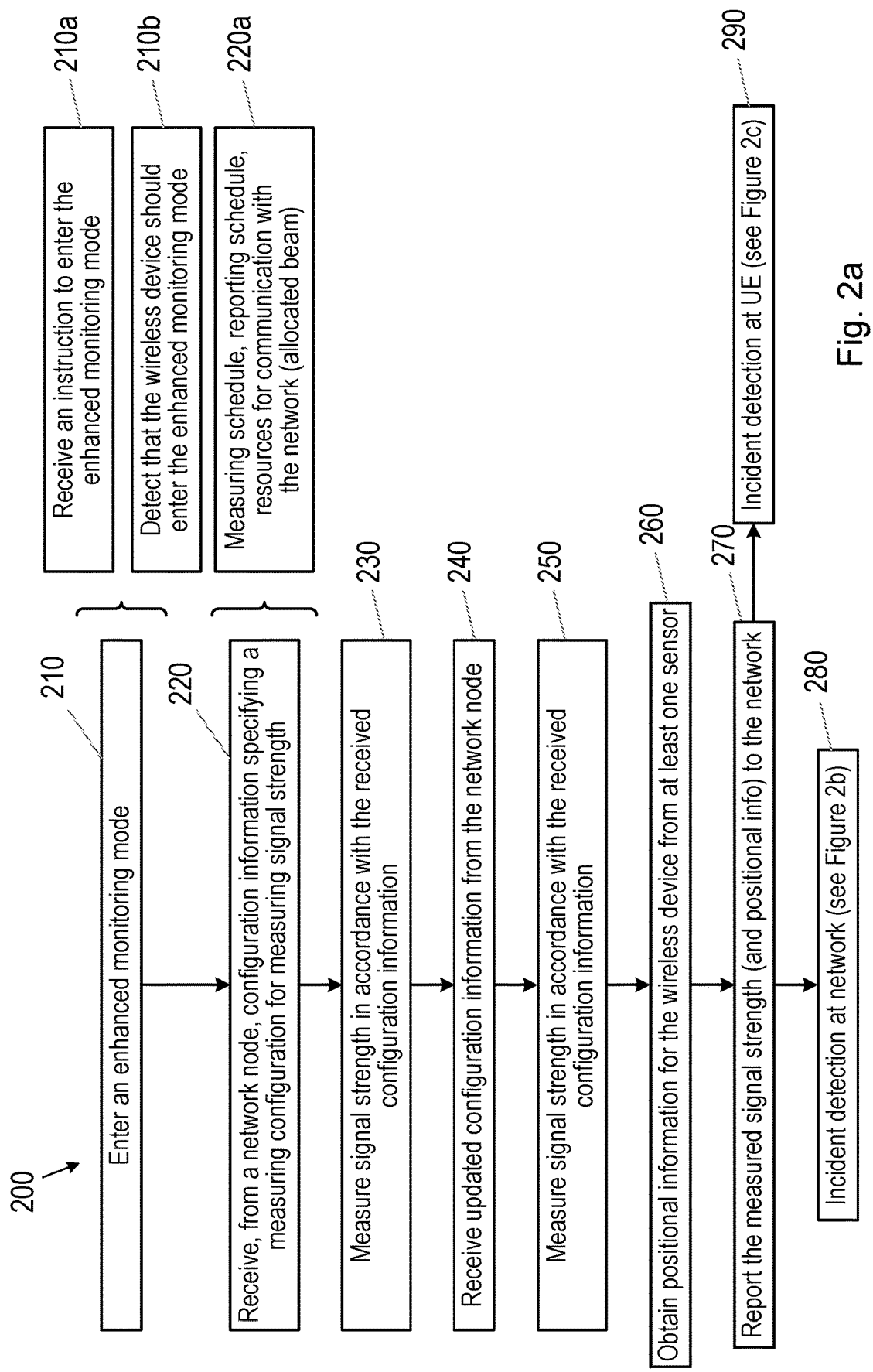

Aspects of the present discloser provide a wireless device, network node and network management node, as well as method performed by such entities. The entities and methods may cooperate to facilitate monitoring of a wireless device, and detection and notification of an incident involving a user of the wireless device. The monitoring may be beam-based monitoring and may be facilitated by dedicated resource allocation.

An overview of wireless device, network node and network management node behavior according to different examples of the present disclosure is provided below, together with discussion of details which may be incorporated in different implementations of these examples. There then follows a discussion of example methods according to the present disclosure, which methods may be implemented by processing circuitry in a wireless device, network node and management node according to the present disclosure.

An example message sequence is then discussed illustrating operation of wireless device, network node and management node according to examples of the present disclosure.

In the following discussion, example implementations of wireless device, network node and management node are discussed. The example implementations include a wireless device in the form of a User Equipment (UE), a network node in the form of an Edge network node such as an Operations Support Server (OSS) or a Business Support Server (BSS), and a management node in the form of a Network Operations Centre (NOC).

According to examples of the present disclosure, when a UE enters a designated operational area or site, it will be attached to "Service Mode" which is an enhanced monitoring mode, allowing for increased monitoring by a controlling function that runs in either a network node (such as an Edge node including OSS/BSS) or a management node such as a NOC. Service Mode attachment can be based on any one or more of GPS location, radio network node/beam signal strength or may be manually triggered by a user of the UE, a NOCs, a third party application, button, etc.

When Service Mode is active, the status of the user of the UE is monitored via the communication with the UE. This monitoring may be achieved in a range of different ways, any one or more of which may be used or combined according to particular deployment requirements or implementation preferences. In one monitoring example, an OSS may configure the UE to report beam/radio network node signal strength with a higher than usual frequency, for example once every 1 ms. In normal operation, a signal report is used by an OSS to handle beam-switch or handover. According to aspects of the present disclosure, the signal report may be used to detect incident which involves a sudden movement such as falling, or an unusual lack of movement. A movement incident will cause a sudden change of signal strength, while a static incident will cause an unusually long period of constant signal strength. Signal strength may be subject to sudden changes during normal operation of a user of the UE, for example owing to the presence of walls or other features of a site that a user may move through, around and between. In order to distinguish between an incident and normal signal strength changes, a machine learning algorithm may be used, as discussed below.

During a testing, learning or pre-configuration stage, a manual scanning or automated scanning of an operational site or environment may be conducted, enabling identification of sudden signal strength changes that are caused by site features and unrelated to a potential incident. Such data may also be collected and updated during normal operation of the user of the UE in Service Mode, allowing training of an algorithm to differentiate between normal and abnormal signal strength changes. In addition, signal strength changes that are wrongly detected as representative of an incident may also be labelled and used as training data to improve a machine learning model. The machine learning algorithm may be a pattern matching algorithm such as sequential pattern mining, or a time-series instance-based algorithm such as like dynamic time warping with k-nearest neighbours. These example algorithm types offer consideration of data in the time domain, which may be helpful, although conversion of data to a non-time domain is possible without losing information, allowing the use of other algorithm types.

One advantage of the above discussed monitoring example is that it does not require any additional functionality in the UE or changes in behaviour from its user in order to implement the monitoring.

In another monitoring example, sensors mounted on the UE or its user may be used to assist. For example, an accelerometer mounted on the UE could provide an additional source of data that could be monitored to detect a potential incident. Such data may in some examples be used to complement signal strength data, offering a corroboration of incident detection based on signal strength, or may be assessed in combination with signal strength data. Accelerometer or other UE/user sensor data may in some examples provide increased accuracy but at the cost of requiring modification to the UE or adding devices to allow connection to an OSS or NOC. In a still further examples, on site information sources such as microphones and/or cameras at the operational site may be accessed to provide a further source of information that could be used to detect an incident.

The algorithms discussed above for the monitoring of, inter alia, signal strength data and the detection of potential incidents may be implemented and running either on an Edge network node such as an OSS/BSS or on a management network node such as a NOC. In some examples, algorithms may be running on both Edge and management network nodes. The choice of where to implement and run detection algorithms may be dependent upon constraints and parameters that are specific to a particular deployment, including link speed, quantity of data for analysis, etc.

While a UE is in the Service Mode, resources may be allocated to support and prioritize monitoring of the UE. If a suspected incident is detected, additional resources may be allocated to the UE, to provide enhanced monitoring, prioritize communication with the UE, including for example transmission of audio and/or video data from the UE, and to support emergency traffic, including notification of and communication with or between Emergency Services. In some examples, beams may be allocated to the operational area or site, specifically for the monitoring of the UE or to support data services to and from the UE. The beams may be allocated from a radio network node within a radio coverage area of which the UE is located and/or from a neighboring radio network node, according to the location of the UE within an area of radio coverage, operational status of the radio network node within the coverage area of which the UE is located, etc. More precise signal strength measurements may be obtained through the allocation of one or more dedicated beams to the UE in service mode, so enhancing the accuracy of incident detection. In some examples, a network service slice may be allocated for an operator, and related network slice selection policy (NSSP) may be configured.

In one example scenario, an operator such as a field technician enters an operational site with a UE. The UE may be any kind of wireless device that is operable to connect to a Radio Access Network. The operator may manually instruct the UE to enter Service Mode, or the UE may detect that it is entering an operational site and request attachment in Service Mode. In other examples, an OSS may detect that the UE is entering an operational site and either allow the UE to attach in Service Mode, cause the UE to attach in Service Mode, or ask a management node such as a NOC whether or not the UE should be attached in Service Mode. With the UE in Service Mode, the OSS pre-allocates resources for traffic, data-processing and signaling. When in Service Mode, the UE sends various sensor data to the OSS, which data may include signal strength, location by GPS or relative location by signal strength, relative location changes by accelerometer data, recoded sound from microphone, etc. The OSS may also be connected to various sensors and cameras at or near the operational site that can be used as input. If incident detection is OSS based, the OSS continuously processes the sensor data from the UE to detect signs of an incident. If a potential incident is detected, the OSS triggers an alarm to Emergency Services and the NOC. If incident detection is NOC based, the OSS forwards received sensor data to the NOC for analysis.

As discussed above, attachment of a UE in Service Mode triggers allocation of recourses to the UE for monitoring of the UE. This resource allocation may include one or more beamforming arrangements to allocate one or more beams to the UE. The beams may be allocated from the site in which the UE is located or a neighboring site. In one example, a UE may be located at the edge of an area of radio coverage, such that more accurate measurements may be obtained from allocation of a beam in a neighboring site. In another example, an operator may be working on a base station, remote radio head or other radio hardware, causing network service in the area of radio coverage to be temporarily suspended. In such circumstances, beams from neighboring radio network nodes may be allocated to ensure network coverage for the UE and allow monitoring of the UE via measured signal strength on the allocated beam. A neighboring site may in some examples be a small cell site, equipped with mmWave antennas. A beam-forming manager (BFM) may use an existing control signal, to measure the signal strength from one or more dedicated beams. UE signal strength is thus directly connected to the one or more allocated beams, based on the reallocation of scheduled service control signaling. While the beam(s) measure the signal strength of the UE, at the same time the beam changes it azimuth and elevation, and if the operator for example falls from an elevated working environment, the following beam azimuth and elevation will rapidly change. These changes can indicate that the operator has fallen, and trigger an alarm from the Base band, BB to the NOC or other entity. In another example, when the UE changes position, or is hidden behind obstacles, a reallocation to another small cell, can be arranged, based on signal strength, so ensuring that monitoring of the UE can continue.

Examples of the above discussed behavior of a wireless device, network node and management node may be implemented via methods performed at these entities, as discussed below. FIGS. 1 to 6 are flow charts illustrating methods 100 to 600 that may be conducted at a wireless device, network node and management node respectively, according to examples of the present disclosure.

FIG. 1 is a flow chart illustrating a method 100 performed by a wireless device that is operable to connect to a network. Referring to FIG. 1, in a first step 110, the wireless device enters an enhanced monitoring mode. This may comprise the Service Mode discussed above. In step 120, the wireless device receives, from a network node, configuration information specifying a measuring configuration for measuring signal strength. In step 130, the wireless device measures signal strength in accordance with the received configuration information.

Figure 2C:
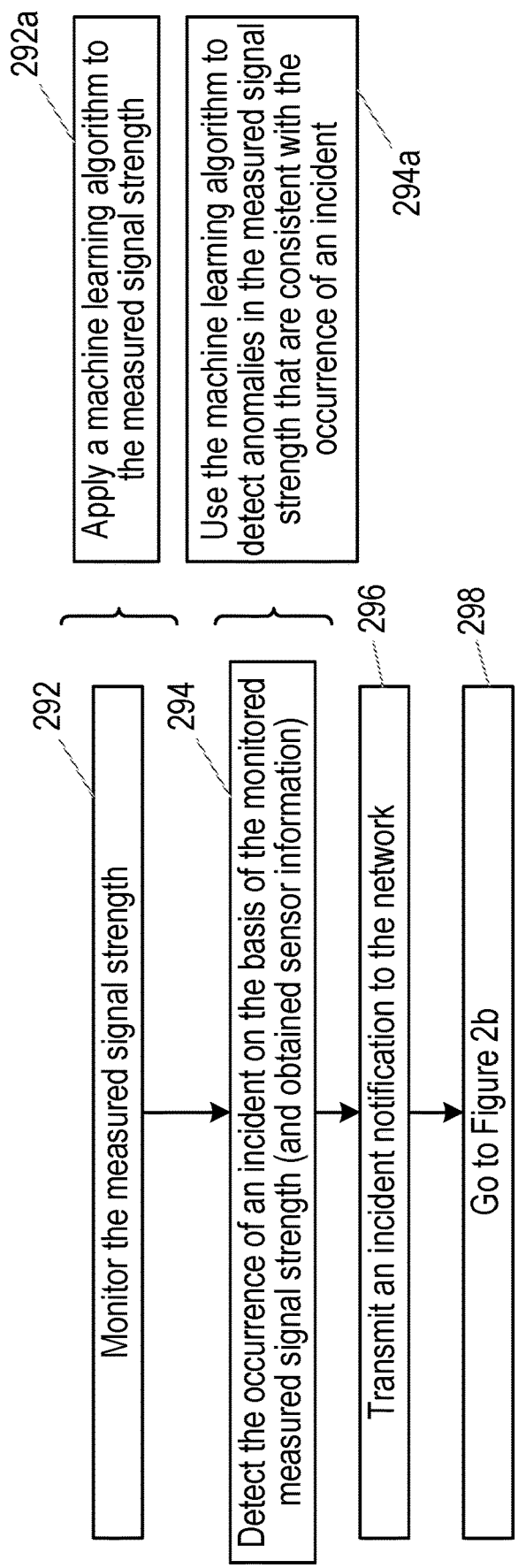

FIGS. 2a to 2c show a flow chart illustrating process steps in another example of method 200 performed by a wireless device that is operable to connect to a network. The steps of the method 200 illustrate an example way in which the steps of the method 100 may be implemented and supplemented in order to achieve the above discussed and additional functionality. The method 200 is discussed below as being performed by a wireless device in the form of as UE, although this is merely one example of a wireless device that may perform the method.

Referring first to FIG. 2a, the UE performing the method 200 enters an enhanced monitoring mode, which may comprise the Service Mode discussed above, in step 210. As illustrated at steps 210a and 210b, this may be performed by receiving an instruction to enter the enhanced monitoring mode, or detecting that the UE should enter the enhanced monitoring mode on the basis of at least one of signal strength measurements and/or location information for the UE. The instruction to enter the enhanced monitoring mode may be received from a user of the UE or from a network node which may be an edge network node or a management node such as a NOC. The instruction received from a network node may be based upon signal strength measurements and/or location information which may be reported by the UE or detected by one or more network nodes. In some examples, entering the enhanced monitoring mode may further comprise connecting to a specific network slice instance that is configured for this purpose.

In step 220, the UE receives, from a network node, configuration information specifying a measuring configuration for measuring signal strength. As illustrated in step 220a, the measuring configuration for measuring signal strength may specify at least one of a measuring schedule for measuring signal strength, a reporting schedule for reporting measured signal strength to the network node and/or resources for communication with the network. The resources for communication with the network may comprise at least one beam that is allocated to the UE. The beam or beams allocated to the UE may comprise beams of a radio network node within a radio coverage area of which the UE is located, and/or may comprise one or more beams of one or more neighboring radio network nodes. The resources may further comprise specific time and/or frequency resources.

In step 230, the UE measures signal strength in accordance with the received configuration information. In step 340, the UE may receive updated configuration information from the network node, and in step 350 the UE may consequently measure signal strength in accordance with the received configuration information. The updated configuration information may for example include a new beam allocation for the UE, identification of one or more additional beams allocated to the UE, a change in the frequency with which signal strength is to be measured and/or reported etc.

In step 260, the UE obtains positional information for the UE from at least one sensor mounted on the UE. The sensor may be an accelerometer, and the positional information may be reported to the network node in the subsequent step 270, together with the monitored signal strength. In some examples, positional information may comprise relative positional information obtained from at least one beam signal strength.

In step 270, the UE reports the measured signal strength to the network.

Actions following step 270 may vary according to where incident detection takes place in different implementations of the method. In implementations in which incident detection takes place at the network, as illustrated at step 280, the UE performs steps 282 to 288 illustrated in FIG. 2b. Referring to FIG. 2b, in such implementations, the UE receives an instruction to activate at least one of audio or video recording on the UE in step 282, activates at least one of audio or video recording on the UE in accordance with the instruction at step 284 and transmits at least one of recorded audio or video to the network in step 286. In some examples of the method 200, activation of audio and or video recording may be conditional on a confirmatory instruction from a user of the UE, or may be cancelled by a contrary instruction from a user of the wireless device. For example, a message may be sent for display on the UE indicating that a suspected incident has been detected and requesting that audio and/or video recording commence. A user may then confirm this instruction if an incident has occurred, or deny the instruction if no incident has occurred and the network has generated a false alarm. In the event that the user is incapacitated and unable to respond to the instruction within a set time period, the network may force compliance with the instruction, such that activation of the audio and/or video is the default action and will be carried out unless the user of the UE explicitly contradicts the received instruction from the network.

In step 288 the UE exits enhanced monitoring mode. This may be triggered by an instruction from the user, by the UE exiting the operational site, or by an instruction from the network indicating that an incident is terminated.

Implementations of the method 200 in which incident detection takes place at the UE are illustrated in FIG. 2c, as set out at step 290 of the method. Referring to FIG. 2c, in such implementations, the UE monitors the measured signal strength in step 292 and detects the occurrence of an incident on the basis of the monitored measured signal strength in step 294. Incident detection may additionally be based on obtained positional information for the UE. As illustrated in steps 292a and 294a, monitoring the measured signal strength may comprise applying a machine learning algorithm to the measured signal strength, and detecting the occurrence of an incident on the basis of the monitored measured signal strength may comprise using the machine learning algorithm to detect anomalies in the measured signal strength that are consistent with the occurrence of an incident. Pattern matching algorithms such as sequential pattern matching, or time series instance based algorithms such as dynamic time warping and k-nearest neighbors, are examples of machine learning algorithms that may be used for the detection of an incident.

Referring still to FIG. 2c, on detecting the occurrence of an incident, the UE transmits an incident notification to the network in step 298. During an incident, the UE may perform steps 282 to 288 as discussed above with reference to FIG. 2b.

The methods 100 and 200, performed by a wireless device, may be complimented by methods 300 and/or 400, performed by a network node, and methods 500 and/or 600, performed by a management node, as illustrated in FIGS. 3 to 6.

Figure 3:
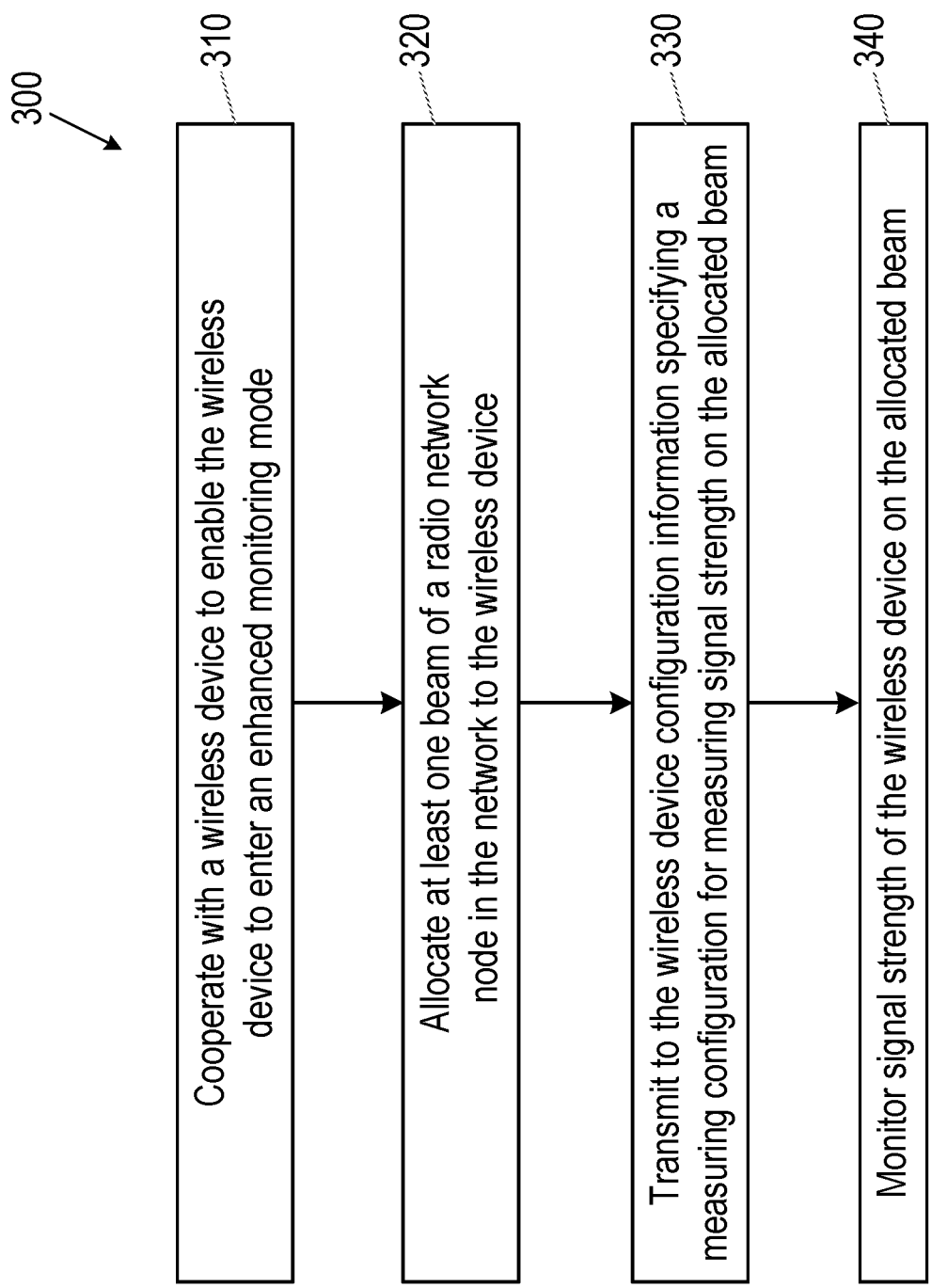
FIG. 3 is a flow chart illustrating a method performed by a network node.

FIG. 3 is a flow chart illustrating a method 300 performed by a network node. The network node may for example be an Edge network node such as an OSS and/or BSS. Referring to FIG. 3, in a first step 310, the network node cooperates with a wireless device to enable the wireless device to enter an enhanced monitoring mode. In step 320, the network node allocates at least one beam of a radio network node in the network to the wireless device. In step 330, the network node transmits to the wireless device configuration information specifying a measuring configuration for measuring signal strength on the allocated beam. In step 340, the network node monitors signal strength of the wireless device on the allocated beam. The radio network node may in some examples comprise a 3GPP based Radio Base Station, serving one or more cells, or on other examples may comprise an IEEE 802.11 Wireless Access Point.

FIGS. 4a to 4d show a flow chart illustrating process steps in another example of method 400 performed by a network node, which may be an Edge network node such as an OSS and/or BSS. The steps of the method 400 illustrate an example way in which the steps of the method 300 may be implemented and supplemented in order to achieve the above discussed and additional functionality.

Figure 4A:
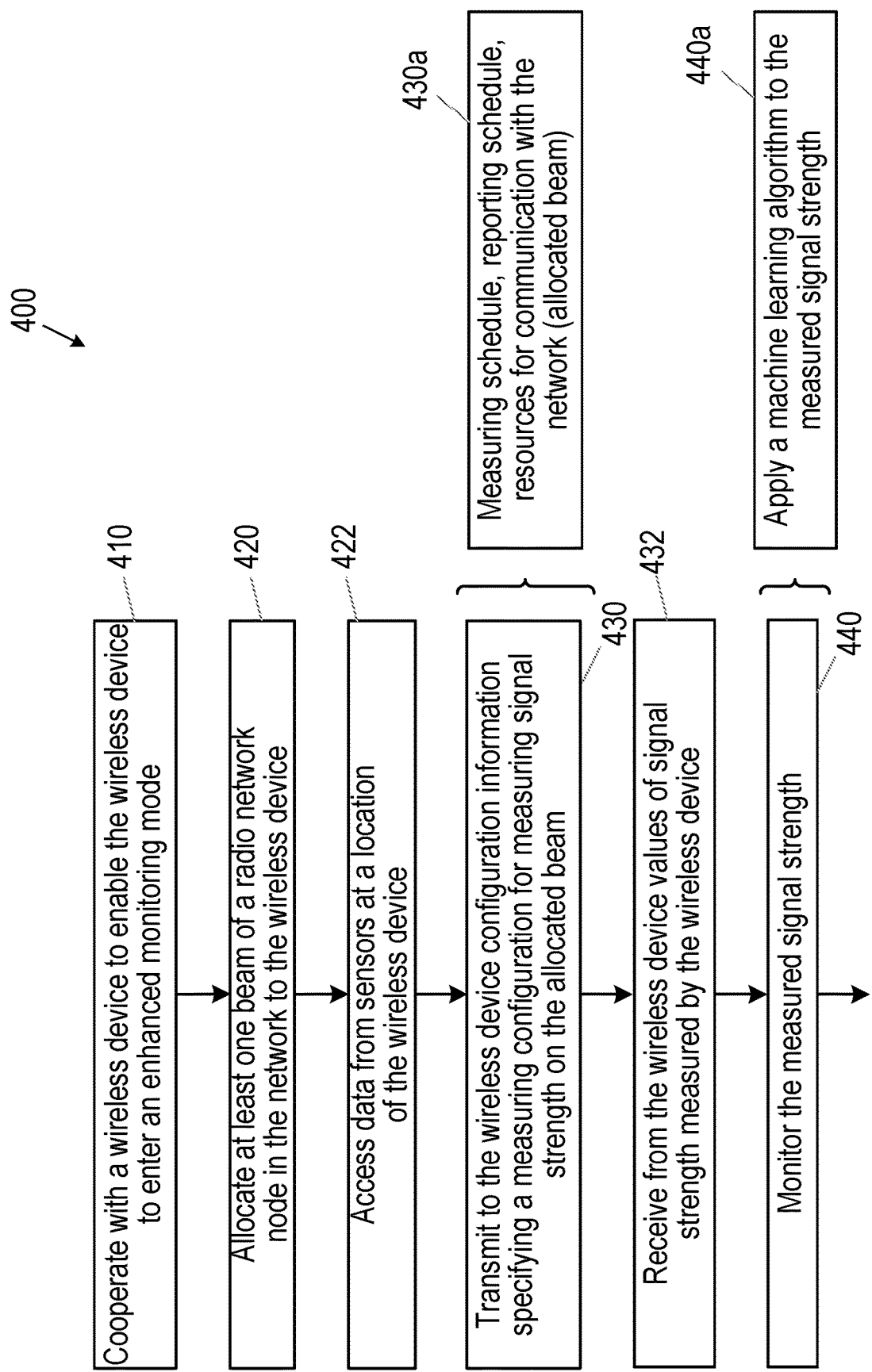
FIGS. 4a to 4d show a flow chart illustrating another example of a method performed by a network node.

Referring initially to FIG. 4a, the network node cooperates with a wireless device such as a UE in step 410 to enable the UE to enter an enhanced monitoring mode. In step 420, the network node allocates at least one beam of a radio network node in the network to the UE. In step 422, the network node accesses data from sensors at a location of the UE. The sensors may include for example security cameras installed at a site in which the UE is located. In step 430, the network node transmits to the UE configuration information specifying a measuring configuration for measuring signal strength on the allocated beam. As illustrated in step 430a, the measuring configuration may specify at least one of a measuring schedule for measuring signal strength, a reporting schedule for reporting measured signal strength to the network node and/or resources for communication with the network. The resources may comprise the at least one beam that is allocated to the UE. As discussed above, the beam or beams allocated to the UE may comprise beams of a radio network node within a radio coverage area of which the UE is located, and/or may comprise one or more beams of one or more neighboring radio network nodes. The resources may further comprise specific time and/or frequency resources. The measuring schedule may include an identification of when signal strength should be measured and on what beam or beams. The reporting schedule may indicate what measurements should be reported and when. In some examples, an average signal strength assembled from several measured signal strengths on different beams may be reported.

In step 440, the network node monitors signal strength of the UE on the allocated beam. As illustrated in step 44a, this may comprise applying a machine learning algorithm to the measured signal strength.

Figure 4B:
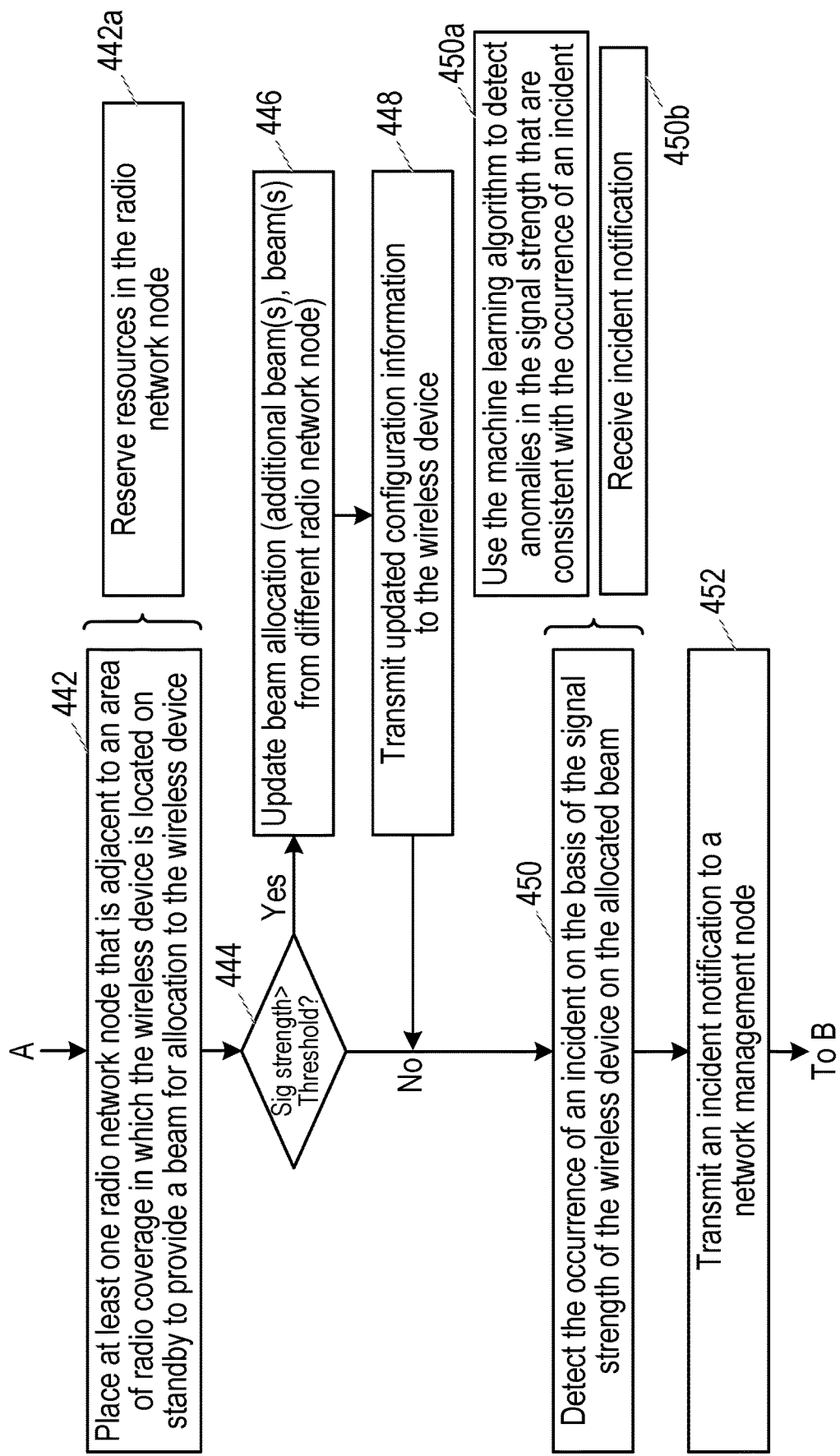

Referring now to FIG. 4b, in step 442, the network node places at least one network radio network node that is adjacent to an area of radio coverage in which the UE is located on standby to provide a beam for allocation to the UE. This may comprise reserving resources in the neighboring radio network node, as illustrated at step 442a.

In step 444, the network node checks whether the monitored signal strength of the UE has fallen below a threshold value. If this is the case, the network node updates the allocation of at least one beam of a radio network node in the network to the UE in step 446 and transmits updated configuration information to the UE in step 448, the updated configuration information comprising the updated allocation of at least one beam to the UE. The updated allocation may include different beams from the same radio network node. Updating the allocation at least one beam of a network radio network node to the UE may comprise allocating at least one additional beam of the radio network node to the UE and/or allocating at least one beam of a different radio network node to the UE, for example according to availability of resources in the radio network nodes, position of the UE with respect to radio network nodes, obstacles etc.

In step 450, the network node detects the occurrence of an incident on the basis of the monitored signal strength of the UE on the allocated beam or beams. This may comprise using the machine learning algorithm to detect anomalies in the measured signal strength that are consistent with the occurrence of an incident, as illustrated in step 450a, or receiving an incident notification, from the UE of from a management node in the network, in step 450b. In some examples, detection may be performed on the basis of fused data including both signal strength information and positional information. The signal strength may be the signal strength as monitored by the network node and/or as measured and reported by the wireless device.

If a machine learning algorithm is used, examples of suitable machine learning algorithms include pattern matching algorithms such as sequential pattern matching, or time series instance based algorithms such as dynamic time warping and k-nearest neighbors. In some examples, the network node may train the machine learning algorithm during a learning phase. The learning phase may correspond to a user of the UE moving around a location in accordance with expected movement patterns.

Figure 4C:
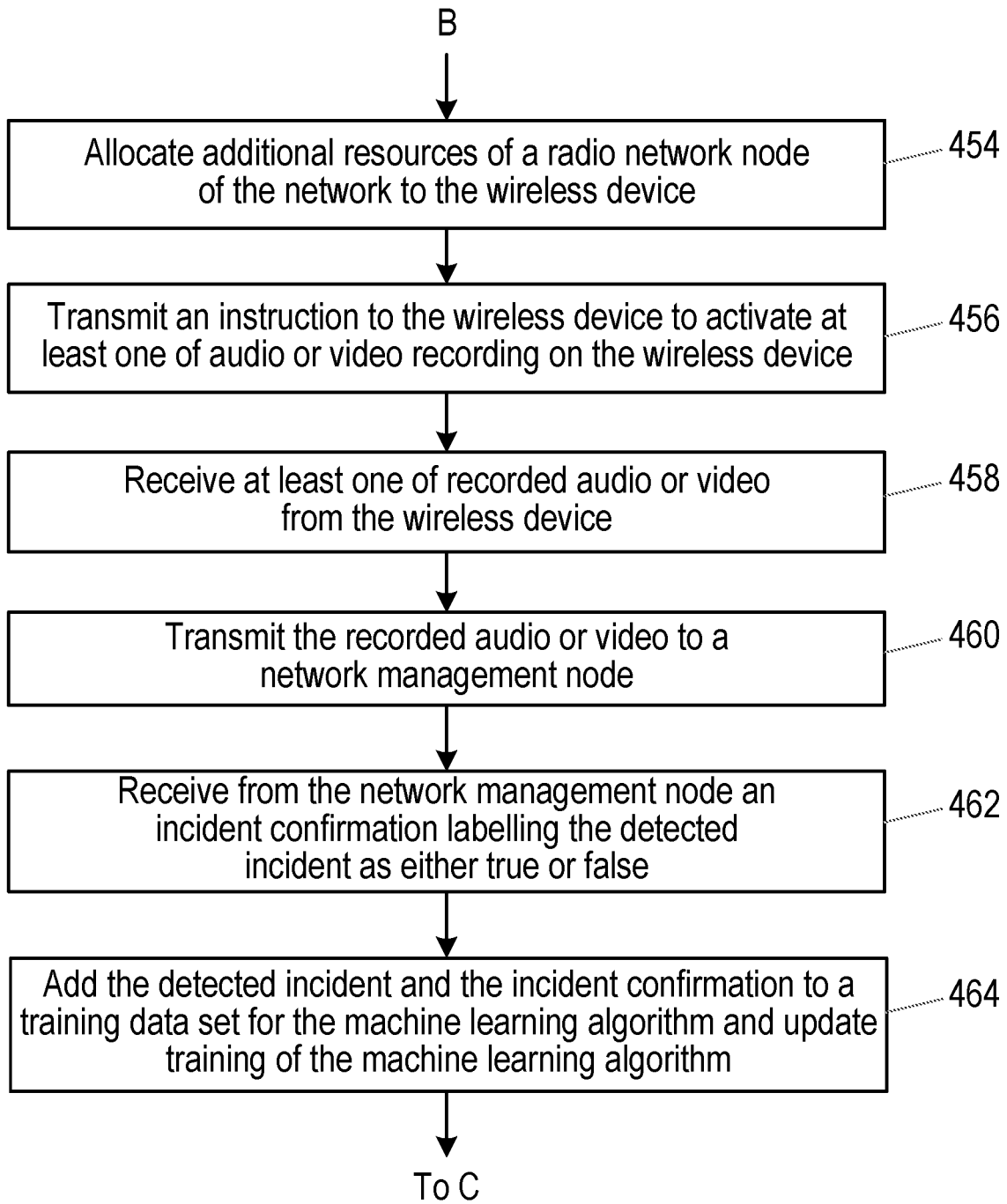
Figure 4D:
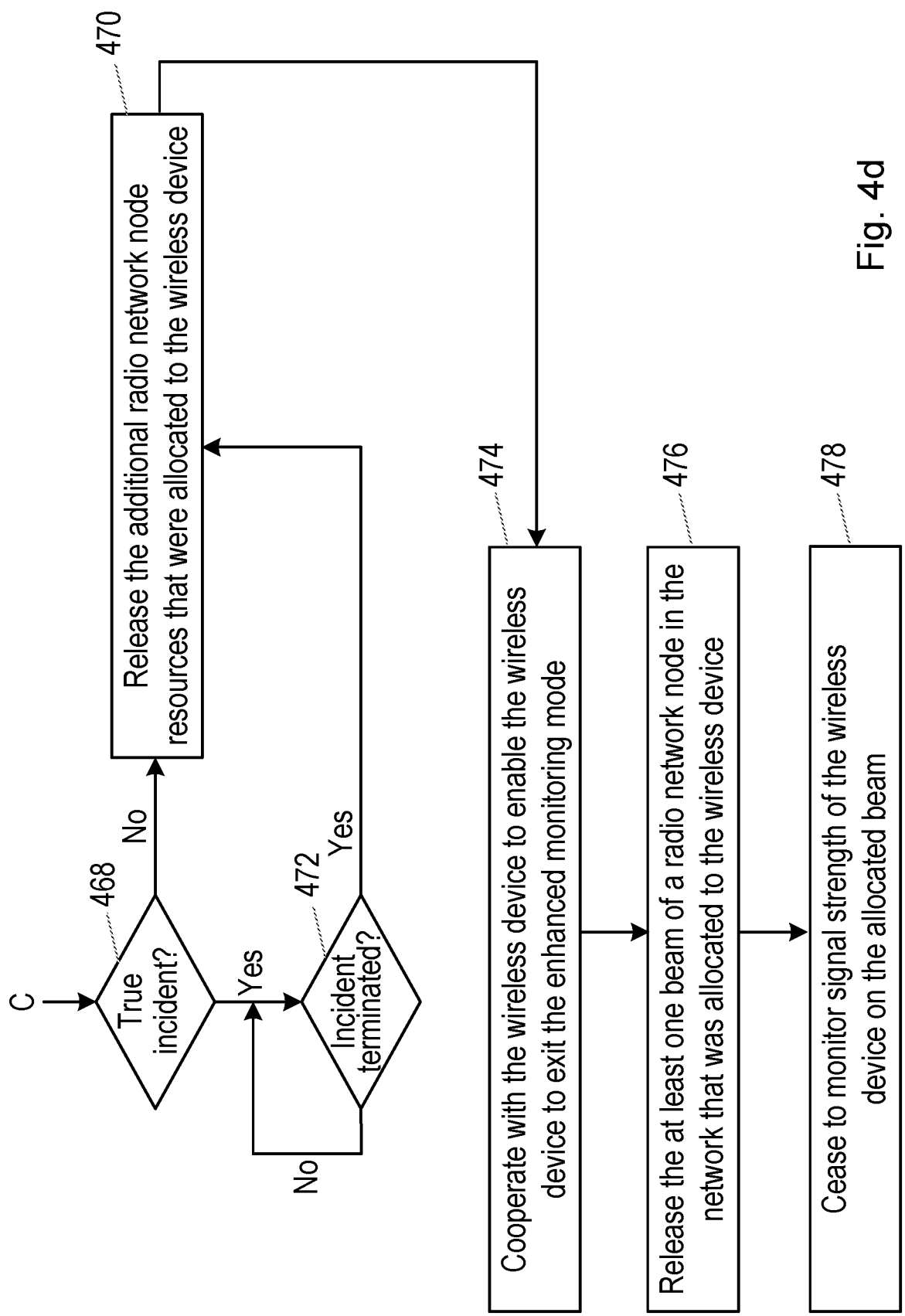

On detecting the occurrence of an incident, in step 452 the network node transmits an incident notification to a network management node such as a NOC and, referring now to FIG. 4c, in step 454, the network node allocates additional resources of a radio network node of the network to the UE. The additional resources may be resources of the radio network node in an area of radio coverage of which the UE is located or a neighboring radio network node. The resources may for example include a data link for audio and video transfer. In step 456, the network node transmits an instruction to the UE to activate at least one of audio or video recording on the UE, and in step 458, the network node receives at least one of recorded audio or video from the UE, which it then transmits to a network management node such as a NOC in step 460.

In step 462, the network node receives from the network management node an incident confirmation labelling the detected incident as either true or false. In step 464, the network node then adds the detected incident and the incident confirmation to a training data set for the machine learning algorithm and updates training of the machine learning algorithm. If the incident confirmation labels the detected incident as false (no in step 468), the network node releases, in step 470, the additional radio network node resources that were allocated to the UE in step 454. If the incident confirmation labels the detected incident as true (yes in step 468), the network node continues to relay data and control signals between the UE and the management node until the network node receives confirmation that the incident is terminated. Once the incident is terminated (yes in step 472), the network node releases the additional resources in step 470.

After releasing the additional resources, and for example following a suitable trigger, the network node cooperates with the UE to enable the UE to exit the enhanced monitoring mode in step 474. The network node then releases the at least one beam of a radio network node in the network that was allocated to the UE in step 476 and ceases to monitor signal strength of the UE on the allocated beam in step 478. The network node also releases any neighboring radio network nodes that were placed on standby to provide beams for allocation to the UE. The trigger to enable the UE to exit the enhanced monitoring mode may comprise detecting that the UE has left an operational site, or receiving an instruction from the UE or from a management node.

Figure 5:
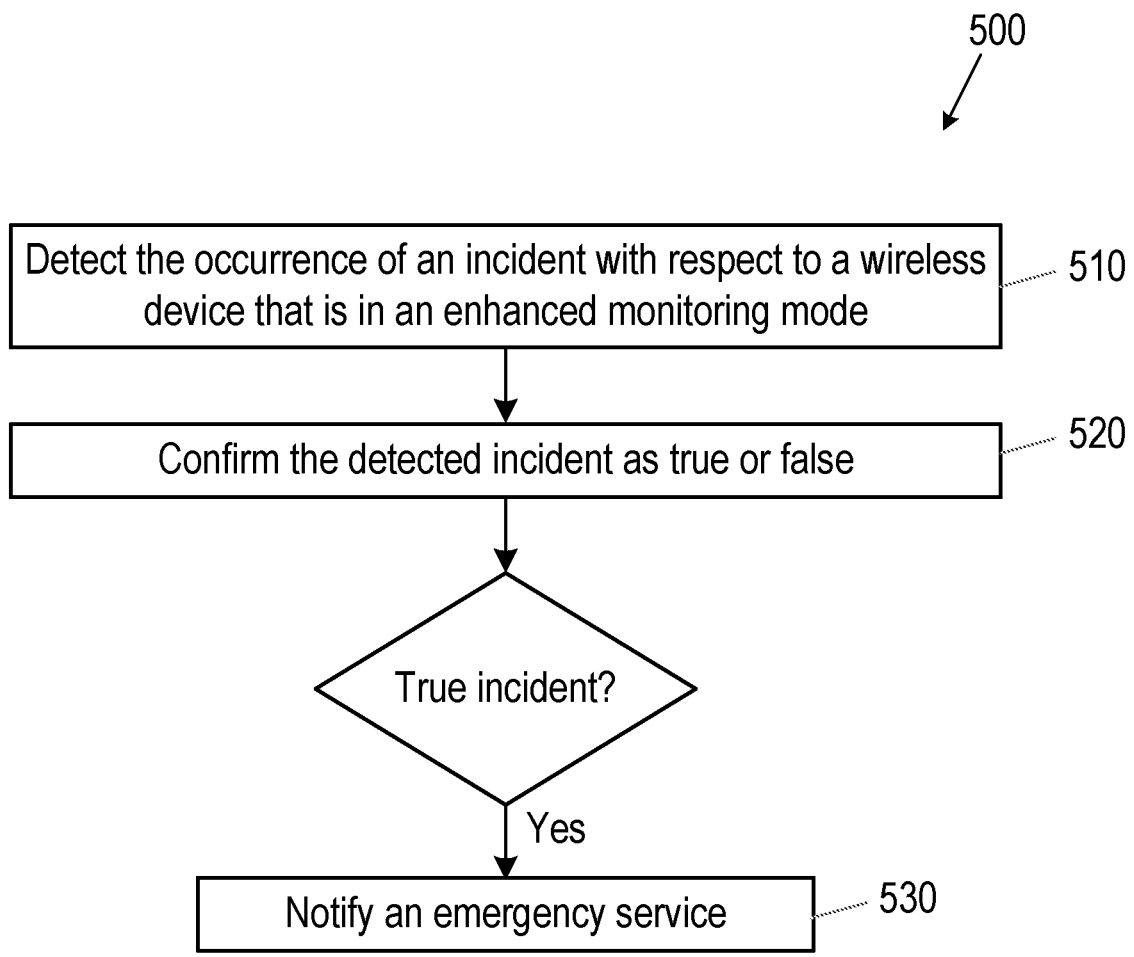
FIG. 5 is a flow chart illustrating a method performed by a network management node.

FIG. 5 is a flow chart illustrating a method 500 performed by a network management node. The management node may for example be a NOC. Referring to FIG. 5, in a first step 510, the management node detects the occurrence of an incident with respect to a wireless device that is in an enhanced monitoring mode. In step 520, the management node confirms the detected incident as true or false, and, if the detected incident is true, the management node notifies an emergency service in step 530.

Figure 6:
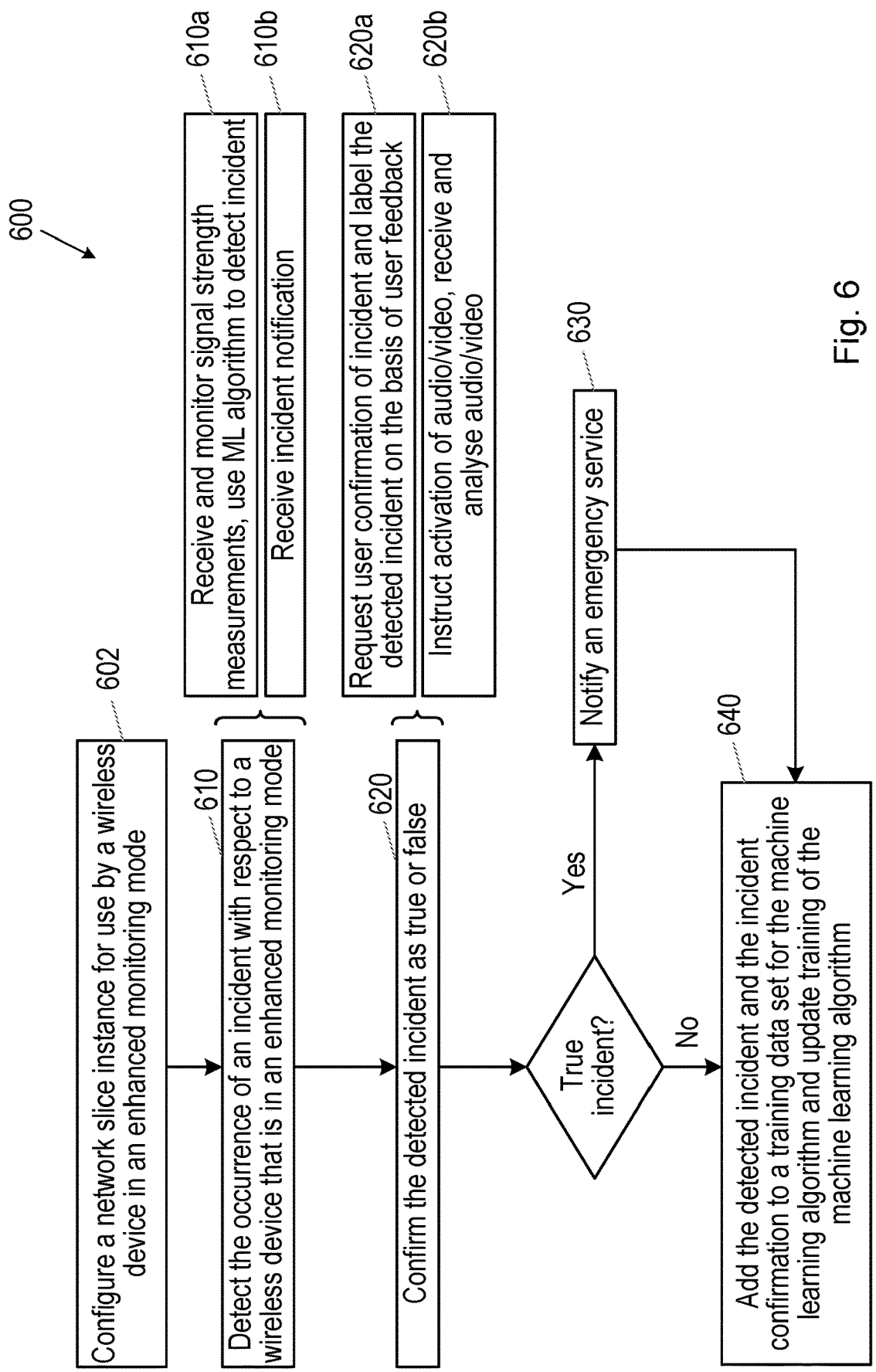
FIG. 6 is a flow chart illustrating another example of a method performed by a management node.

FIG. 6 is a flow chart illustrating process steps in another example of method 600 performed by a management node, which may be a NOC. The steps of the method 600 illustrate an example way in which the steps of the method 500 may be implemented and supplemented in order to achieve the above discussed and additional functionality.

Referring to FIG. 6, in a first step 602, the management node configures a network slice instance for use by a wireless device such as a UE in an enhanced monitoring mode. The management node may additionally configure network slice selection policy in accordance with the configured network slice instance.

In step 610, the management node detects the occurrence of an incident with respect to a wireless device that is in an enhanced monitoring mode. This may comprise receiving an incident notification from another network node in step 610b, or receiving signal strength measurements for the wireless device, monitoring the received signal strength measurements, and detecting the occurrence of an incident on the basis of the monitored signal strength measurements in step 610a. Monitoring the received signal strength measurements may comprises applying a machine learning algorithm to the received signal strength measurements, and detecting the occurrence of an incident on the basis of the monitored signal strength measurements may comprise using the machine learning algorithm to detect anomalies in the signal strength measurements that are consistent with the occurrence of an incident, as discussed above with respect to monitoring and detection at the UE or network node. Examples of machine learning algorithms for the detection of an incident may include pattern matching algorithms such as sequential pattern matching, or time series instance based algorithms such as dynamic time warping and k-nearest neighbours. The management node may additionally train the machine learning algorithm during a learning phase. The learning phase may correspond to a user of the wireless device moving around a location in accordance with expected movement patterns.

In step 620, the management node confirms the detected incident as true or false. This step may comprise requesting user confirmation of an incident and labelling the detected incident as true or false on the basis of received user feedback in step 620a. Alternatively, or in the absence of user feedback, confirming the detected incident as true or false may comprise instructing activation of at least one of audio or video recording on the wireless device, receiving at least one of recorded audio or video from the wireless device and analyzing the received at least one of recorded audio or video in step 620b. In some examples, the instruction to activate the audio and/or video may be conditional on a confirmatory instruction from a user of the wireless device, for example if a detection confidence of the detected incident is low, or may be cancelled by a contrary instruction from a user of the wireless device.

Having confirmed the detected incident as true or false, the management node sends an incident confirmation labelling the detected incident as true or false to another network node. If the detected incident is a true incident, the management node notifies an emergency service in step 630. Following notification, or if the incident is false, the management node adds the detected incident and the incident confirmation to a training data set for the machine learning algorithm and updates training of the machine learning algorithm.

Figure 7A:
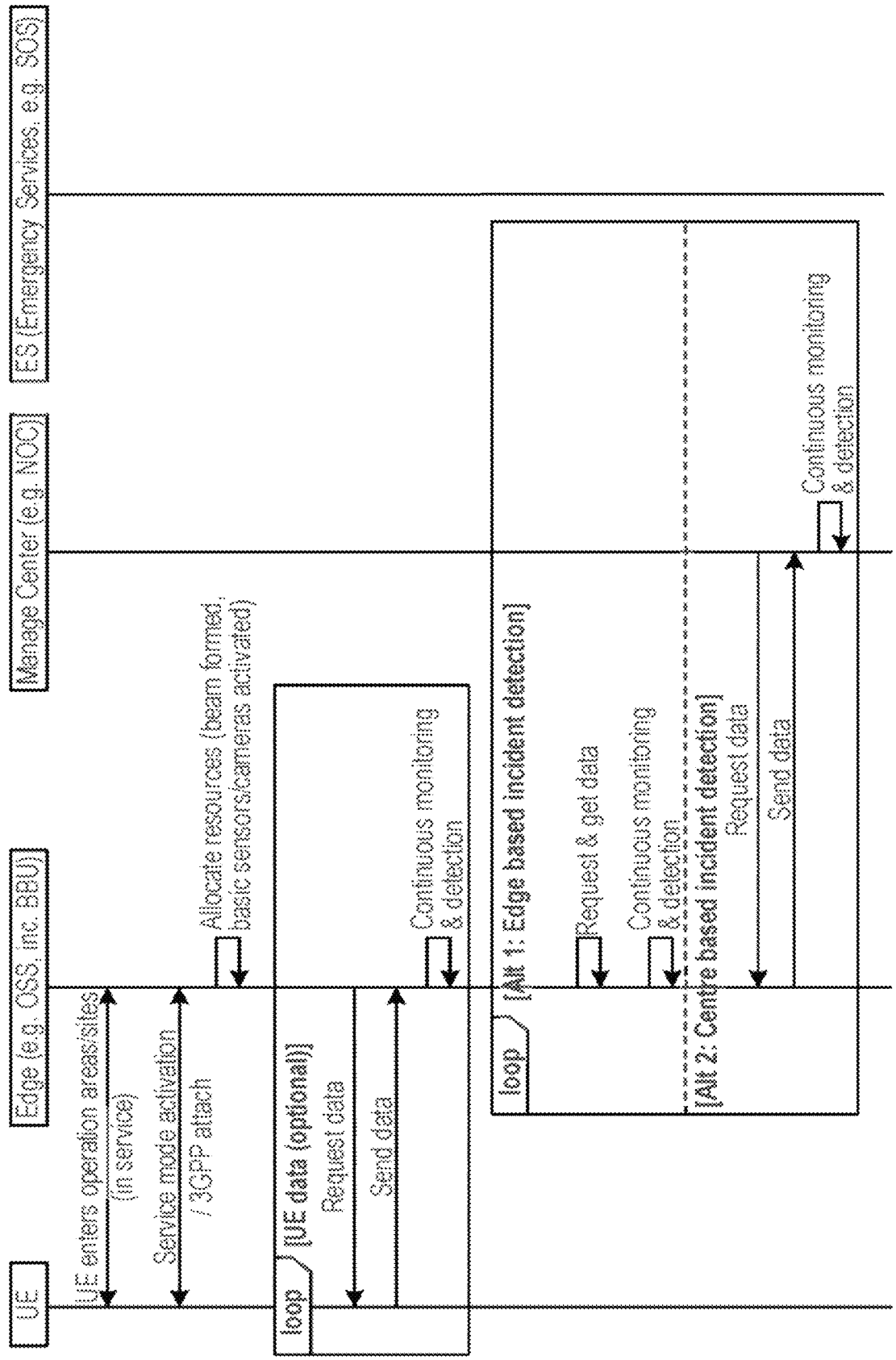
FIGS. 7A-7C are a message flow diagram.
Figure 7B:
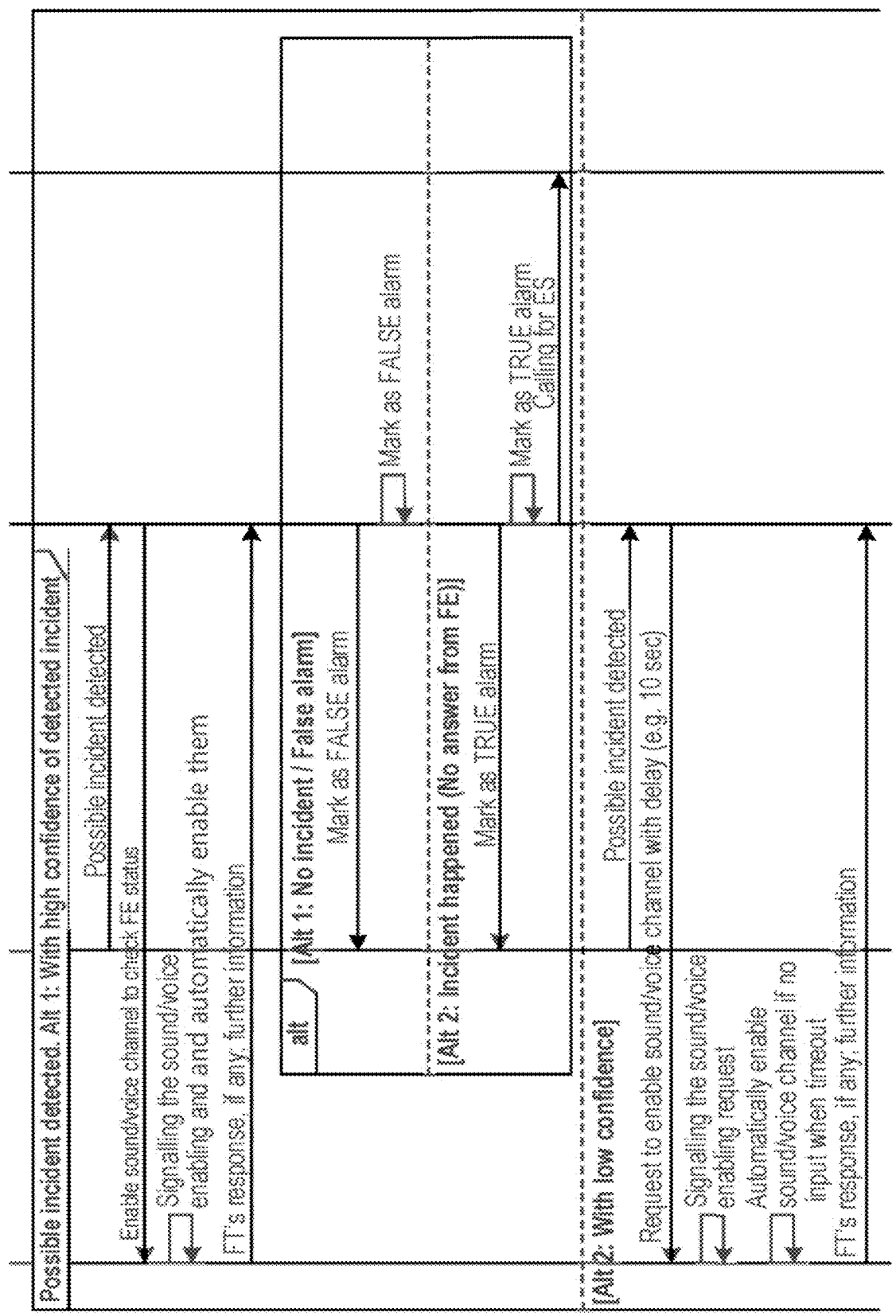
Figure 7C:
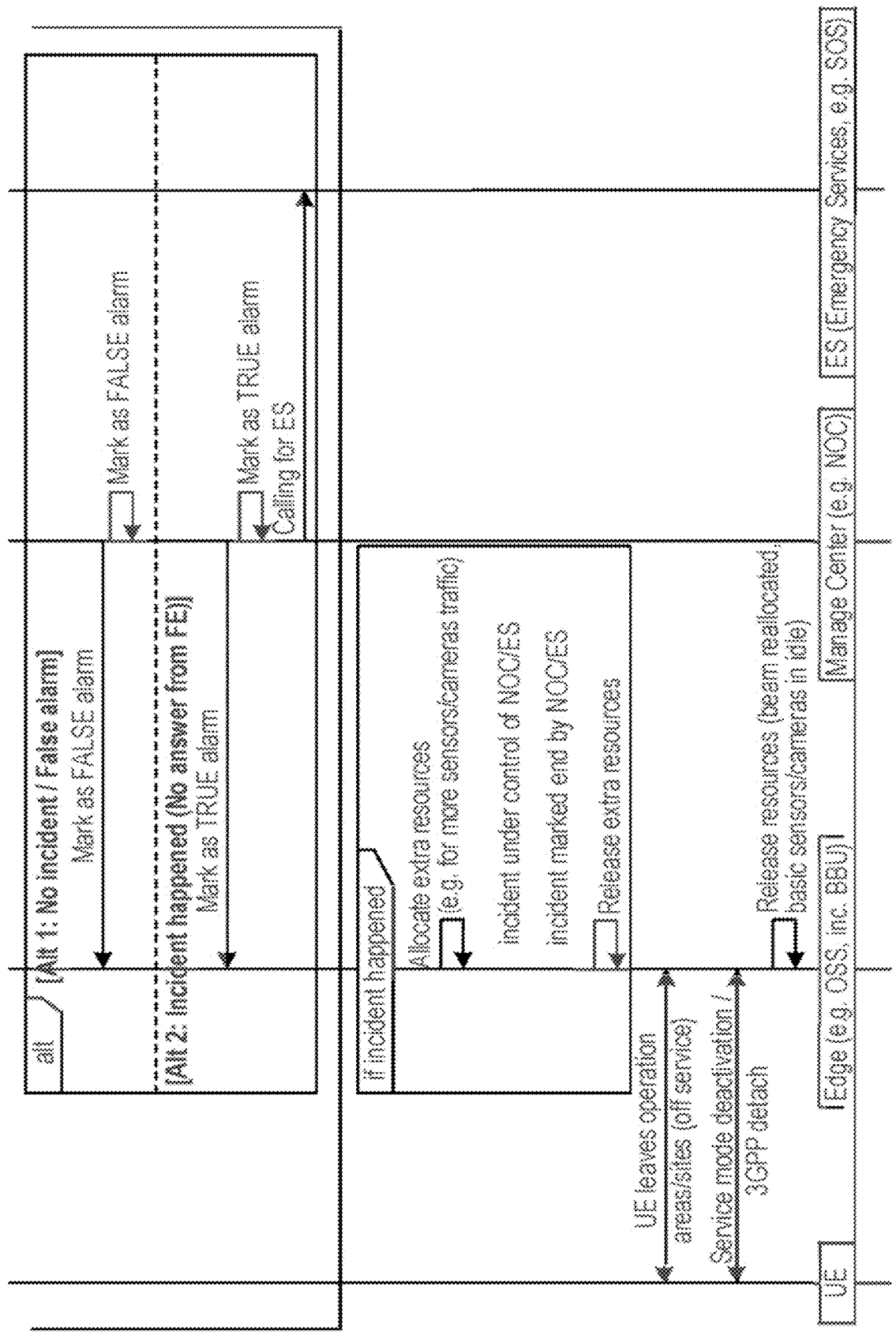

The methods 100 to 600 discussed above illustrate different ways in which a wireless device, network node and management node may cooperate to enable monitoring of an operator in an operational site, detection of incidents and notification of emergency services. FIGS. 7A-7C are a message flow diagram illustrating example exchanges between a UE, network node, management node and emergency services according to different examples of the methods discussed above. FIGS. 7A-7C illustrate an OSS, including a BBU, as an example of a network node, and a management centre such as a NOC as an example of a management node.

Referring to FIGS. 7A-7C, when the UE enters an operational site, an enhanced monitoring mode, illustrated as Service Mode, is activated on the UE, either manually or automatically. This activation triggers allocation of resources to the UE by the OSS. The OSS then continually receives data from the UE and monitors the data. As discussed above, incident detection may take place in the network node or in the management node, or in the UE itself. Detection in the network node and management node are illustrated in FIGS. 7A-7C, as Alternatives 1 and 2.

When an incident is detected, different actions are taken according to the confidence with which the incident has been detected. For an incident detected with high confidence, illustrated as Alternative 1, the UE is requested to provide a cancellation input manually from the operator, indicating that no incident has occurred. In the absence of a cancellation input, a call is made directly to emergency services after a timeout. At the same time, audio and video are activated on the UE, either without delay or with a very short delay. For an incident detected with low confidence, illustrated as Alternative 2, a confirmation procedure is triggered via an audio and/or video channel, and a call to emergency services is made automatically if no manual cancellation is received within a timeout period. If manual cancellation is received, the incident is marked as a false alarm and the system returns to continuous monitoring. For a true incident, additional resources are allocated to the UE, including for example a data link for audio and video transfer. When the UE exits the operational site, or the incident is terminated, the additional resources allocated to the UE are released.

It is envisaged that the enhanced monitoring mode, illustrated as Service Mode, in FIGS. 7A-7C, may be implemented in various ways in a 3GPP network, according to particular deployment scenarios or operational criteria. In one example, emergency attach functionality, available in LTE and 5G and described in 3GPP 23.401 may be used. In this example, it may be assumed that network operator policy supports emergency attach and has configured the emergency configuration at the core network to establish emergency bearer connection between the UE and the management node. In another example, Mission Critical Services may be used to implement the enhanced monitoring mode. From release 14, 3GPP has specified a set of services called "Mission Critical" (MC) Services. Of particular interest are the MC Data services described in TS 23.282, and specifically the "Short Data Service" (SDS), which allows UEs to communicate with a server using high priority data transmission tunnels. Using SDS, UEs can report their location and signal strength to the NOC. This example would require an SDS function to be present in both the UE and the NOC. Such a function may be implemented using software only.

As discussed above, the methods disclosed herein are performed by a wireless device, network node and management node. The present disclosure provides a wireless device, network node and management node which are adapted to perform any or all of the steps of the above discussed methods.

Figure 8:
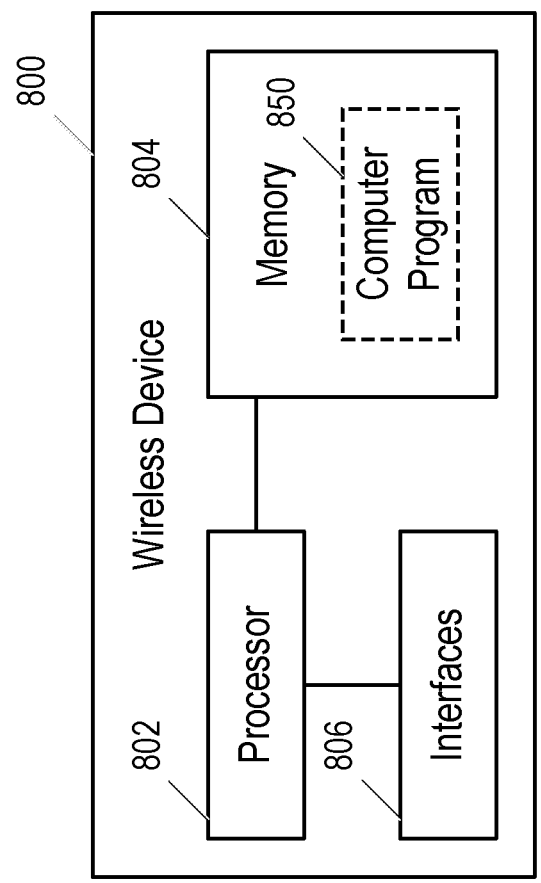
FIG. 8 is a block diagram illustrating functional modules in a wireless device.

FIG. 8 is a block diagram illustrating an example wireless device 800 which may implement the method 100 and/or 200 according to examples of the present disclosure, for example on receipt of suitable instructions from a computer program 850. Referring to FIG. 8, the wireless device 800 comprises a processor or processing circuitry 802, and may comprise a memory 804 and interfaces 806. The processing circuitry 802 is operable to perform some or all of the steps of the method 100 and/or 200 as discussed above with reference to FIGS. 1 and 2. The memory 804 may contain instructions executable by the processing circuitry 802 such that the wireless device 800 is operable to perform some or all of the steps of the method 100 and/or 200. The instructions may also include instructions for executing one or more telecommunications and/or data communications protocols. The instructions may be stored in the form of the computer program 850. In some examples, the processor or processing circuitry 802 may include one or more microprocessors or microcontrollers, as well as other digital hardware, which may include digital signal processors (DSPs), special-purpose digital logic, etc. The processor or processing circuitry 802 may be implemented by any type of integrated circuit, such as an Application Specific Integrated Circuit (ASIC), Field Programmable Gate Array (FPGA) etc. The memory 804 may include one or several types of memory suitable for the processor, such as read-only memory (ROM), random-access memory, cache memory, flash memory devices, optical storage devices, solid state disk, hard disk drive etc.

Figure 9:
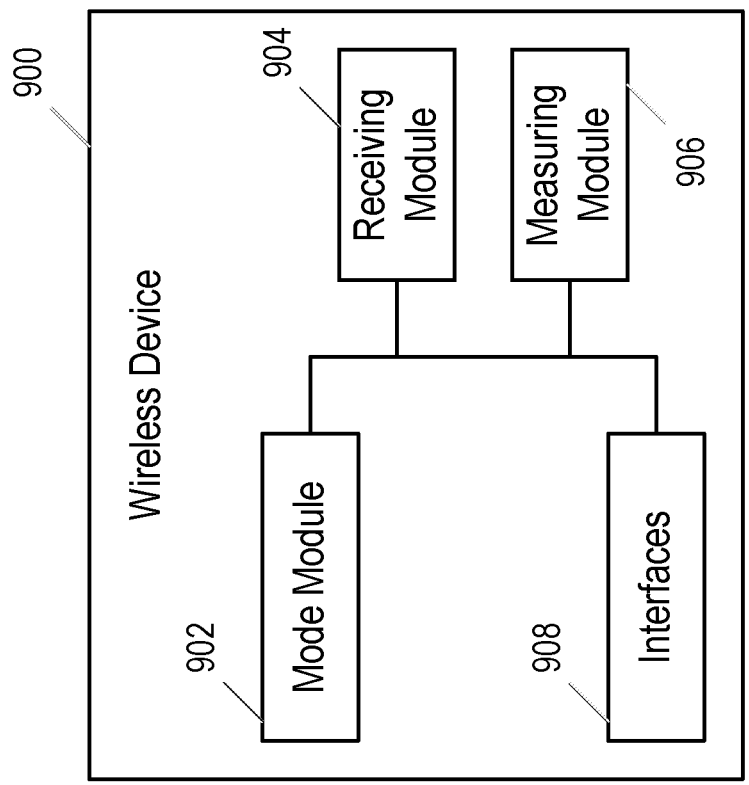
FIG. 9 is a block diagram illustrating functional modules in another example of a wireless device.

FIG. 9 illustrates functional units in another example of wireless device 900 which may execute examples of the methods 100 and/or 200 of the present disclosure, for example according to computer readable instructions received from a computer program. It will be understood that the units illustrated in FIG. 9 are functional units, and may be realised in any appropriate combination of hardware and/or software. The units may comprise one or more processors and may be integrated to any degree.

Referring to FIG. 9, the wireless device 900 comprises a mode module 902 for entering an enhanced monitoring mode, a receiving module 904 for receiving, from a network node, configuration information specifying a measuring configuration for measuring signal strength, and a measuring module 906 for measuring signal strength in accordance with the received configuration information. The wireless device 900 may also comprise interfaces 908.

Figure 10:
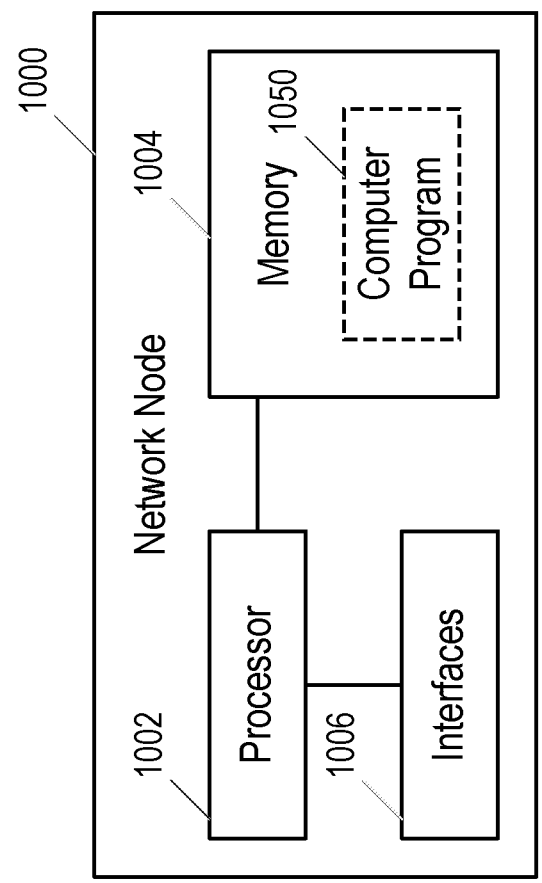
FIG. 10 is a block diagram illustrating functional modules in a network node.

FIG. 10 is a block diagram illustrating an example network node 1000 which may implement the method 300 and/or 400 according to examples of the present disclosure, for example on receipt of suitable instructions from a computer program 1050. Referring to FIG. 10, the network node 1000 comprises a processor or processing circuitry 1002, and may comprise a memory 1004 and interfaces 1006. The processing circuitry 1002 is operable to perform some or all of the steps of the method 300 and/or 400 as discussed above with reference to FIGS. 3 and 4. The memory 1004 may contain instructions executable by the processing circuitry 1002 such that the network node 1000 is operable to perform some or all of the steps of the method 300 and/or 400. The instructions may also include instructions for executing one or more telecommunications and/or data communications protocols. The instructions may be stored in the form of the computer program 1050. In some examples, the processor or processing circuitry 1002 may include one or more microprocessors or microcontrollers, as well as other digital hardware, which may include digital signal processors (DSPs), special-purpose digital logic, etc. The processor or processing circuitry 1002 may be implemented by any type of integrated circuit, such as an Application Specific Integrated Circuit (ASIC), Field Programmable Gate Array (FPGA) etc. The memory 1004 may include one or several types of memory suitable for the processor, such as read-only memory (ROM), random-access memory, cache memory, flash memory devices, optical storage devices, solid state disk, hard disk drive etc.

Figure 11:
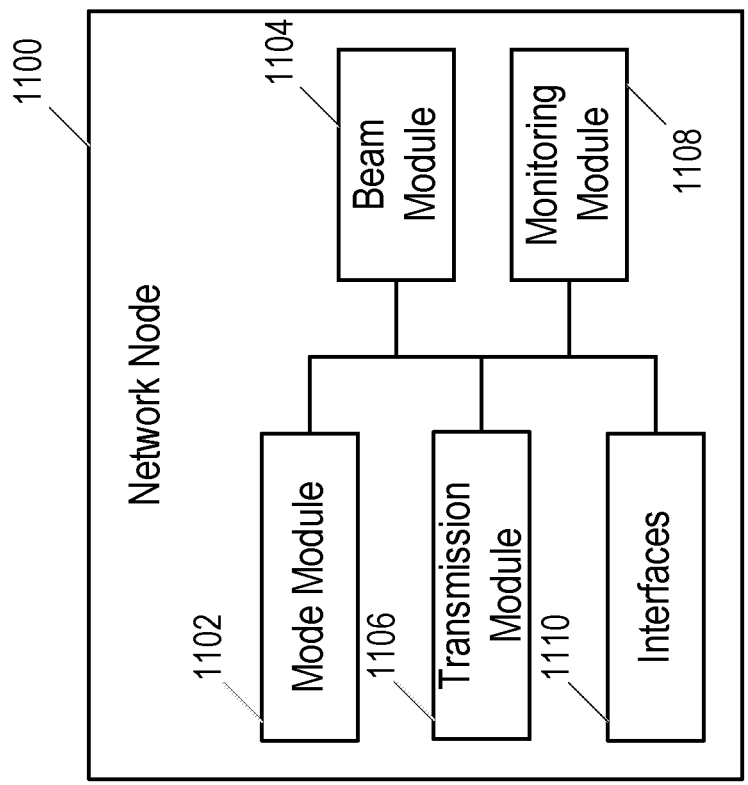
FIG. 11 is a block diagram illustrating functional modules in another example of a network node.

FIG. 11 illustrates functional units in another example of network node 1100 which may execute examples of the methods 300 and/or 400 of the present disclosure, for example according to computer readable instructions received from a computer program. It will be understood that the units illustrated in FIG. 11 are functional units, and may be realised in any appropriate combination of hardware and/or software. The units may comprise one or more processors and may be integrated to any degree.

Referring to FIG. 11, the network node 1100 comprises a mode module 1102 for cooperating with a wireless device to enable the wireless device to enter an enhanced monitoring mode. The network node 1100 further comprises a beam module 1104 for allocating at least one beam of a radio network node in the network to the wireless device, and a transmission module 1106 for transmitting to the wireless device configuration information specifying a measuring configuration for measuring signal strength on the allocated beam. The network node further comprises a monitoring module 1108 for monitoring signal strength of the wireless device on the allocated beam. The network node may further comprise interfaces 1110.

Figure 12:
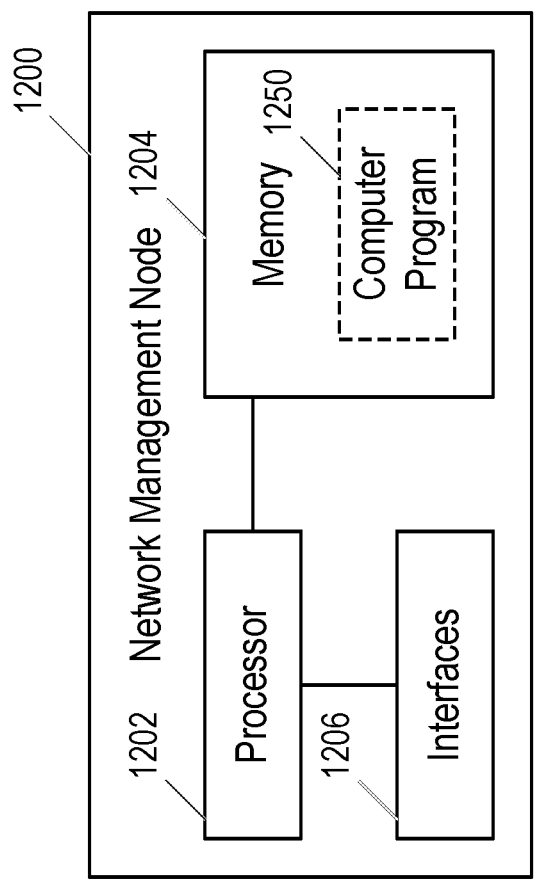
FIG. 12 is a block diagram illustrating functional modules in a network management node.

FIG. 12 is a block diagram illustrating an example network management node 1200 which may implement the method 500 and/or 600 according to examples of the present disclosure, for example on receipt of suitable instructions from a computer program 1250. Referring to FIG. 12, the management node 1200 comprises a processor or processing circuitry 1202, and may comprise a memory 1204 and interfaces 1206. The processing circuitry 1202 is operable to perform some or all of the steps of the method 500 and/or 600 as discussed above with reference to FIGS. 5 and 6. The memory 1204 may contain instructions executable by the processing circuitry 1202 such that the network node 1200 is operable to perform some or all of the steps of the method 500 and/or 600. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

Figure 13:
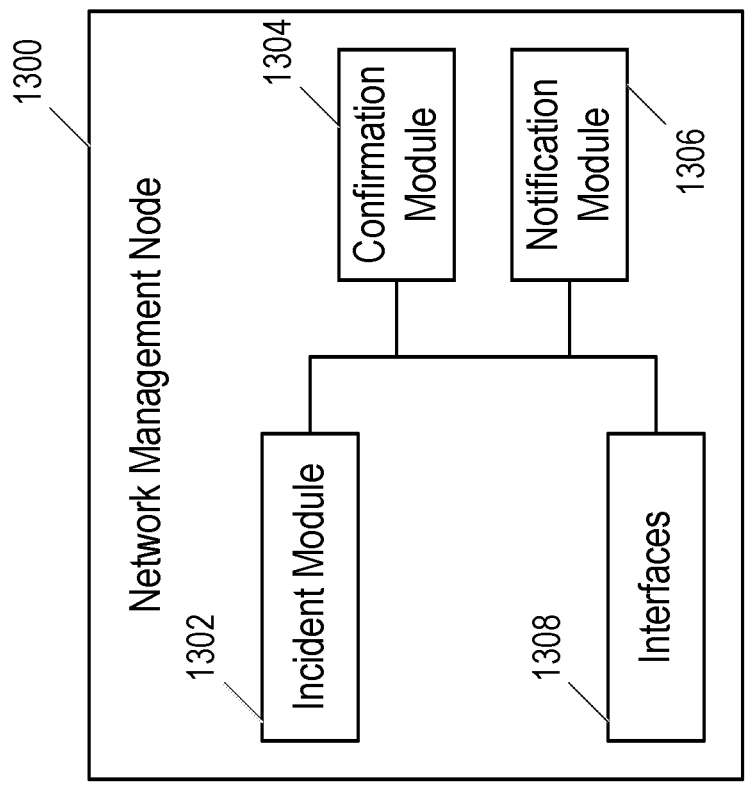
FIG. 13 is a block diagram illustrating functional modules in another example of a network management node.

FIG. 13 illustrates functional units in another example of network management node 1300 which may execute examples of the methods 500 and/or 600 of the present disclosure, for example according to computer readable instructions received from a computer program. It will be understood that the units illustrated in FIG. 13 are functional units, and may be realised in any appropriate combination of hardware and/or software. The units may comprise one or more processors and may be integrated to any degree.

Referring to FIG. 13, the management node 1300 comprises an incident module 1302 for detecting the occurrence of an incident with respect to a wireless device that is in an enhanced monitoring mode. The management node further comprises a confirmation module 1304 for confirming the detected incident as true or false, and a notification module 1306 for, if the detected incident is true, notifying an emergency service. The management node may additionally comprise interfaces 1308.

Aspects and examples of the present disclosure thus provide methods and apparatus that may cooperate to automatically detect incidents involving an operator at an operational site, to shorten incident report time with respect to existing procedures and to increase the safety of engineers, technicians and other operators who may be deployed for interventions on operational sites. An operational site may comprise any location or environment to which an engineer, technician, or other operator is deployed for an intervention or other task. The methods disclosed herein use an enhanced monitoring mode which, once activated on an operator's wireless device, triggers allocation of resources to the device and monitoring of the device using those resources. Incident detection is performed on the basis of the monitoring, and subsequent incident reporting and requests to emergency services are carried out on the basis of the incident detection. Examples of the present disclosure may be used alongside existing alarm and safety procedures to provide additional security, particularly for operators working alone, as well as shorted reaction and response times in the event of an incident.

Examples of the present disclosure achieve the above discussed monitoring, detection and response through, inter alia, allocation of a beam arrangement to specific service for an operator, activation of a service slice enabling a reallocation of beam arrangement of neighboring site radio network nodes, such as small cells, to follow the signal strength of the operator's wireless device, and reallocation of service beam to neighboring sites.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A wireless device that is operable to connect to a network, the wireless device comprising processing circuitry configured to cause the wireless device to perform operations comprising:

receiving, from a network node, configuration information specifying a measuring configuration for measuring signal strength of the wireless device;

measuring the signal strength in accordance with the received configuration information;

monitoring the measured signal strength; and detecting an occurrence of an incident on a basis of the monitored measured signal strength, wherein monitoring the measured signal strength comprises applying a machine learning algorithm to the measured signal strength; and wherein detecting the occurrence of an incident on the basis of the monitored measured signal strength comprises using the machine learning algorithm to detect anomalies in the measured signal strength that are consistent with the occurrence of an incident.

2. A wireless device as claimed in claim 1, wherein the measuring configuration for measuring signal strength specifies at least one of:

a measuring schedule for measuring signal strength;

a reporting schedule for reporting measured signal strength to the network node;

resources for communication with the network.

3. A wireless device as claimed in claim 2, wherein the resources for communication with the network comprise at least one beam that is allocated to the wireless device.

4. A wireless device as claimed in claim 1, wherein the processing circuitry is further configured to cause the wireless device to:

obtain positional information for the wireless device from at least one sensor mounted on the wireless device.

5. A wireless device as claimed in claim 1, wherein the processing circuitry is further configured to cause the wireless device to:

receive an instruction to activate at least one of audio or video recording on the wireless device;

activate at least one of audio or video recording on the wireless device; and transmit at least one of recorded audio or video to the network.

6. A wireless device as claimed in claim 1, wherein entering an enhanced monitoring mode comprises at least one of:

receiving an instruction to enter the enhanced monitoring mode; or detecting that the wireless device should enter the enhanced monitoring mode on the basis of at least one of:

signal strength measurements;

location information for the wireless device.

7. A wireless device as claimed in claim 1, wherein the processing circuitry is further configured to cause the wireless device to obtain positional information for the wireless device from at least one sensor mounted on the wireless device, and further wherein detecting the occurrence of an incident on the basis of the monitored measured signal strength further comprises detecting the occurrence of an incident on the basis of the monitored measured signal strength and the obtained positional information for the wireless device.

8. A wireless device as claimed in claim 1, wherein the processing circuitry is further configured to cause the wireless device to, on detecting the occurrence of an incident, transmit an incident notification to the network.

9. A wireless device as claimed in claim 1, wherein the processing circuitry is further configured to cause the wireless device to perform:
  entering an enhanced monitoring mode.

10. A network node, the network node comprising processing circuitry configured to cause the network node to perform operations comprising:
  allocating at least one beam of a radio network node in a network to the wireless device;
  transmitting to the wireless device configuration information specifying a measuring configuration for measuring signal strength of the wireless device on the allocated beam;
  monitoring a measured signal strength of the wireless device on the allocated beam; and
  detecting an occurrence of an incident on a basis of the monitored measured signal strength of the wireless device on the allocated beam,
  wherein monitoring the measured signal strength comprises applying a machine learning algorithm to the measured signal strength; and wherein detecting the occurrence of an incident on the basis of the signal strength comprises using the machine learning algorithm to detect anomalies in the measured signal strength that are consistent with the occurrence of an incident.

11. A network node as claimed in claim 10, wherein the measuring configuration for measuring signal strength specifies at least one of:
  a measuring schedule for measuring signal strength;
  a reporting schedule for reporting measured signal strength to the network node; and
  resources for communication with the network.

12. A network node as claimed in claim 11, wherein the resources for communication with the network comprise the at least one beam that is allocated to the wireless device.

13. A network node as claimed in claim 10, wherein the processing circuitry is further configured to cause the network node to:
  responsive to monitored signal strength of the wireless device falling below a threshold value, update the allocation of at least one beam of a radio network node in the network to the wireless device.

14. A network node as claimed in claim 13, wherein updating the allocation of at least one beam of a radio network node in the network to the wireless device comprises at least one of:
  allocating at least one additional beam of the radio network node to the wireless device;
  allocating at least one beam of a different radio network node to the wireless device.

15. A network node as claimed in claim 13, wherein the processing circuitry is further configured to cause the network node to:
  transmit updated configuration information to the wireless device, the updated configuration information comprising the updated allocation of at least one beam to the wireless device.

16. A network node as claimed in claim 10, wherein the processing circuitry is further configured to cause the network node to:
  place at least one radio network node that is adjacent to an area of radio coverage in which the wireless device is located on standby to provide a beam for allocation to the wireless device.

17. A network node as claimed in claim 16, wherein placing a radio network node on standby to provide a beam for allocation to the wireless device comprises reserving resources in the radio network node.

18. A network node as claimed in claim 10, wherein the processing circuitry is further configured to cause the network node to:
  access data from sensors at a location of the wireless device.

19. A network node as claimed in claim 10, wherein detecting the occurrence of an incident on the basis of the monitored measured signal strength comprises receiving an incident notification from the wireless device, the incident notification generated by the wireless device on the basis of the signal strength measured by the wireless device.

20. A network node as claimed in claim 10, wherein the processing circuitry is further configured to cause the network node to:
  on detecting the occurrence of an incident:
  transmit an incident notification to a network management node; and
  allocate additional resources of a radio network node of the network to the wireless device.

21. A network node as claimed in claim 20, wherein the processing circuitry is further configured to cause the network node to:
  receive from the network management node an incident confirmation labelling the detected incident as either true or false.

22. A network node as claimed in claim 21, wherein monitoring the measured signal strength comprises applying a machine learning algorithm to the measured signal strength; and wherein detecting the occurrence of an incident on the basis of the signal strength comprises using the machine learning algorithm to detect anomalies in the measured signal strength that are consistent with the occurrence of an incident, and wherein the processing circuitry is further configured to cause the network node to:
  add the detected incident and the incident confirmation to a training data set for the machine learning algorithm; and
  update training of the machine learning algorithm.

23. A network node as claimed in claim 21, wherein the processing circuitry is further configured to cause the network node to:
  on detecting the occurrence of an incident:
  transmit an incident notification to a network management node; and
  allocate additional resources of a radio network node of the network to the wireless device, and
  wherein the processing circuitry is further configured to cause the network node to:
  if the incident confirmation labels the detected incident as false, release the additional radio network node resources that were allocated to the wireless device.

24. A network node as claimed in claim 10, wherein the processing circuitry is further configured to cause the network node to:
on detecting the occurrence of an incident:
transmit an instruction to the wireless device to activate at least one of audio or video recording on the wireless device;
receive at least one of recorded audio or video from the wireless device; and
transmit the recorded audio or video to a network management node.

25. A network node as claimed in claim 10, wherein the processing circuitry is further configured to cause the network node to:
cooperate with the wireless device to enable the wireless device to exit the enhanced monitoring mode;
release the at least one beam of a radio network node in the network that was allocated to the wireless device; and
cease to monitor signal strength of the wireless device on the allocated beam.

26. A network node as claimed in claim 10, wherein the processing circuitry is further configured to cause the network node to perform:
cooperating with a wireless device to enable the wireless device to enter an enhanced monitoring mode.

27. A method for operating a wireless device that is operable to connect to a network, the method, performed by the wireless device, comprising:
entering an enhanced monitoring mode;
receiving, from a network node, configuration information specifying a measuring configuration for measuring signal strength of the wireless device;
measuring the signal strength in accordance with the received configuration information;
monitoring the measured signal strength; and
detecting an occurrence of an incident on a basis of the monitored measured signal strength,
wherein monitoring the measured signal strength comprises applying a machine learning algorithm to the measured signal strength; and wherein detecting the occurrence of an incident on the basis of the monitored measured signal strength comprises using the machine learning algorithm to detect anomalies in the measured signal strength that are consistent with the occurrence of an incident.

* * * * *